3,341,416
ENCAPSULATION OF ASPIRIN IN ETHYL-CELLULOSE AND ITS PRODUCT

Jerrold L. Anderson, Gary L. Gardner, and Noble H. Yoshida, Dayton, Ohio, assignors to The National Cash Register Company, Dayton, Ohio, a corporation of Maryland
No Drawing. Filed Dec. 11, 1963, Ser. No. 329,887
14 Claims. (Cl. 167—83)

This invention relates to the encapsulation of aspirin in ethyl cellulose and to its product.

Aspirin, as manufactured, commonly contains some dissociation products. This dissociation content increases slowly when the aspirin is in contact with certain materials, especially at high humidity. In the encapsulation of aspirin it is highly desirable to have the aspirin in a state in which these dissociation products are held at a minimum during the encapsulation and later storage.

The encapsulation process of this invention provides means for the minute or micro-encapsulation of tiny particles of the aspirin, each particle entity being confined and protected in a wall of ethyl cellulose, which has been grown thereon in incremental deposits from an agitated hot liquid solution, said means including a step of liquid-liquid phase-separation brought about by cooling of an ethyl cellulose solution. In this invention, the phase separation is induced in a cyclohexane solution of ethyl cellulose by the presence of polyethylene which takes part in the system as a phase-separation-inducing agent, but takes no part in the composition of the capsule wall except as to a small amount which may be carried thereinto by entrainment. The polyethylene in such amounts is practically all eliminated from the capsule walls, and such of it as remains is innocuous as far as its effect on the human body is concerned, and its presence does not contribute in any way to the dissociation of the aspirin contained within the capsule walls.

As a pre-treatment, to furnish the aspirin with acid buffering material to retard its environmentally-induced hydrolysis in the encapsulated form, the powdered aspirin first is dispersed and washed in an aqueous solution of an acid buffering salt which is adjusted to a pH of between 2.3 and 4.5 with the acid of the particular buffering salt used, for 10 minutes, or so, after which the aspirin is filtered off but has retained thereon the buffering material, which in no way interferes with thet subsequent utility of the aspirin in the use thereof as a medicament. Among the acid buffering salts that may be used the best now known are mono-basic, mono-hydrate sodium phosphate; mono-basic potassium phosphate; and mono-basic ammonium phosphate. The filtered product is dried, as by placing it in an oven at 40 degrees centigrade for a sufficient period of time to dry off the residual aqueous material.

Next, to proceed with the actual encapsulation process, the aspirin is dispersed as particles in a hot system (80 degrees centigrade) comprising a cyclohexane bath containing dissolved therein ethyl cellulose and polyethylene. The relative amounts of capsule-forming materials dispersed in the cyclohexane can be varied greatly but the cyclohexane forms the major portion of the system to provide a roomy dispersion medium for the insoluble aspirin. For instance, based on the weight of cyclohexane, 25 percent or less of aspirin, 1 to 3 percent of the specified polyethylene, and ½ to 3 percent of the specified ethyl cellulose are used. For the purpose of inhibiting hydrolysis of the aspirin during the encapsulation in the cyclohexane medium, there may be added ½ percent more or less of acetic anhydride, in the manner disclosed in the application for United States Letters Patent SN 214,183, filed by Robert Miller and Jerrold Anderson on Aug. 21, 1962 now U.S. Patent No. 3,155,590. The use of acetic anhydride in such encapsulation procedures involving aspirin has been known, as shown therein, for use in conjunction with cyclohexane as the despersing medium and butyl rubber as a phase-separation-inducing material.

This invention differs from the before-mentioned disclosure of an aspirin encapsulation process in the cited United States application, in that in this invention there is a pre-treatment of the aspirin with the buffering salt and in the fact that a particularly-suitable phase-seperation-inducing polymeric material (polyethylene) is used which offers no hydrolysis problem as concerns the aspirin in the presence of moisture.

EXAMPLE I

As a preferred example of the invention, including the optinonal step, there is mixed together at room temperature the following material:

| | Lbs. |
|---|---|
| Water (distilled or deionized) | 80 |
| Mono-basic potassium phosphate | 4.3 |
| Aspirin (powdered to pass a 20 mesh U.S. Standard Sieve) | 30 |

Phosphoric acid sufficient to bring the pH to 2.3.

This mixture is stirred for 10 minutes more or less, at room temperature (20 degrees to 25 degrees centigrade), and the residual so-treated aspirin then is recovered as by filtering and drying. In the encapsulation part of the process, the following dispersion is made at room temperature:

| | Lbs. |
|---|---|
| Cyclohexane | 490 |
| Polyethylene as specified | 10 |
| Acetic anhydride | 2.5 |
| Ethyl cellulose as specified | 3 |

The ethyl cellulose used should have an ethoxyl content of 40.8–49.5 percent, which gives the necessary solution properties in cyclohexane near its boiling point, such ethyl cellulose material not being soluble therein at room temperature. This ethyl cellulose should also have a viscosity of 90–105 as determined with a 5 percent solution of it in an 80/20 toluene/ethanol bath according to the Ostwald method with Cannon-Fenske equipment as disclosed in the United State National Formulary, Edition 11, 1960, pages 135–136. The polyethylene selected is a low viscosity material having a molecular weight of approximately 7000, and a ring and ball softening point of 100–101 degrees centigrade according to the American Society for Testing Materials Specification D–36–26.

Both the ethyl cellulose and the polyethylene are soluble in cyclohexane at 80 degrees centigrade and the system is agitated and heated to that point before the introduction thereinto of 105 pounds of the treated aspirin in the specified particulate size. After complete dispersion has been reached, but with continued dispersion maintained by agitation, the temperature is dropped to room temperature over a period of approximately two hours, by artificial cooling if necessary, during which time the ethyl cellulose first has detached itself from the homogeneous solution as a separate liquid phase which individually deposits on and wraps the aspirin particles in a liquid wall. As cooling progresses the deposited ethyl cellulose becomes more or less solid by desolvation, and the polyethylene for the most part has remained in the cyclohexane as extremely fine particles of solid material, whereas the embryo capsules are such as would be retained on a 60 mesh Standard United States Screen. Therefore, the ethyl cellulose coated aspirin particles may be recovered by filtering and hardened by further drying of the cyclohexane therefrom. The filter-cake is washed several times in fresh cyclohexane, or other drying solvent, to remove residual polyethylene and acetic anhydride as may adhere to or have been entrained on the capsule walls. After washing is completed, the capsule dispersion material may be filtered dry to a cake and placed on a vibrating-screen-classifier, and dry air is blown through the classifier screen at 40 degrees centigrade for a period of 15 minutes to half an hour at which time the capsules are removed from the vibrating screen classifier and placed on trays in a 40 degrees centigrade dry air circulating oven to remain until the residual cyclohexane, or other solvent, is removed to approximately 200 parts per million by weight. Other methods of recovering the capsules, as by centrifuging or decanting, may be used. This material is fit for medication as is—or as further dispersed in a palatable non-solvent—or as tableted with or without binder material.

The product made by this process has three characteristics that render it a superior medicament over what has been known in that (a) it is completely tasteless, (b) because it is not released entirely in the stomach but depends upon aqueous diffusion through the capsule wall membrane, a minimum amount of release occurs in the stomach, and (c) the release continues slowly all along the extent of the intestinal tract.

EXAMPLE II

In this example the amount of ethyl cellulose as used in Example I may be varied from the 3 lbs. noted for the particular mixture by an increase in amount thereof up to 15 lbs.

EXAMPLE III

In this example, which pertains to capsules with thicker walls, the process is similar to Example I but the amount of ethyl cellulose used is increased to 10 lbs. from 3 lbs., and the amount of aspirin is reduced from 105 lbs. to 90 lbs. It will be appreciated that this formulation differs from that of Examples I and II in that there is a change both in the ethyl cellulose content and in the aspirin content, relative to the other ingredients, and will give an accordingly thicker coating on the aspirin particles, with a solids content in the dispersion of 100 lbs. in terms of ethyl cellulose and aspirin, whereas the solids content of Example I is 108 lbs. and that of Examle II is 120 lbs.

EXAMPLE IV

In this example the composition of Example I is used, except that a quantity of Myvacet (which is an acetylated mono-glyceride) made by the Eastman Chemical Company, of from one to three times that of the ethyl cellulose by weight, which lowers the phase-separation temperature of the ethyl cellulose to around 50 degrees centigrade, is used.

EXAMPLE V

In this example the specified aspirin size is varied as desired to any dispersible size conformable to the parameters of the materials used in the composition as far as the coverage of the surface area by the particles of the ethyl cellulose is concerned.

The particulate conformation of the particles of aspirin may be of any shape controlled by the method of comminution, precipitation, or other means of formation.

While it has been stated that there is a certain order of addition of the components to the composition with respect to the time of raising the temperature and the cooling thereof, it is to be understood that the process is not dependent on the order of addition and all of the component materials thereof may be assembled in the cold state, as at room temperature, for subsequent use by the later-undertaken steps of heating and agitation to bring about the formation of the separated ethyl cellulose solution phase and the encapsulation of the dispersed particles of aspirin with it to form embryonic capsules which later are stabilized by cooling the system.

What is claimed is:

1. A composition for the en masse individual encapsulation of minute particles of aspirin in polymeric material, by use of agitation, and heating, followed by cooling with continued agitation, consisting of
    (a) a vehicle consisting of a major part, by weight, of cyclohexane, and a minor part, by weight, of polyethylene characterized substantially by having a molecular weight of about 7000 and a softening point of about 100–101 degrees centigrade;
    (b) a minor part, by weight, of ethyl cellulose having an ethoxyl content of 48.0 to 49.5 percent, by weight, and a viscosity of 90–105; and
    (c) a minor part, by weight, of powdered aspirin.

2. The composition of claim 1 in which the aspirin constitutes less than 25 percent, by weight, of the whole to insure complete dispersion.

3. The composition of claim 1 in which the polyethylene constitutes from 1 to 3 percent, by weight, of the whole.

4. The composition of claim 1 in which the ethyl cellulose constitutes from ½ to 3 percent, by weight, of the whole.

5. The composition of claim 1 in which mono-basic-sodiumphosphate-treated aspirin is used for element (c).

6. The composition of claim 5 in which (c) constitutes less than 25 percent, by weight, of the whole.

7. The composition of claim 5 in which the polyethylene constitutes from 1 to 3 percent, by weight, of the whole.

8. A process for the en masse individual encapsulation of minute particles of aspirin, including the steps of
    (a) forming a composition of the elements
        (1) cyclohexane heated to 80 degrees centigrade constituting at least 75 percent of the weight,
        (2) powdered aspirin 19 to 23½ percent of the weight,
        (3) ½ to 3 percent, by weight, of ethyl cellulose, and
        (4) polyethylene of 7000 molecular weight 1 to 3 percent, by weight as a phase-separation-inducing agent; and
    (b) with stirring to form a homogeneous mixture-dispersion, cooling the stirred composition to room temperature, which forms ethyl cellulose-walled capsules which may have a small amount of polyethylene which may be carried thereinto, by washing in a solvent for polyethylene in order to practically eliminate all of the polyethylene from the capsule wall and drying.

9. The process of claim 8 in which the washing solvent is fresh cyclohexane.

10. The process of claim 8 in which the aspirin material is such aspirin that has been treated with an acid buffer salt.

11. The process of claim 10 in which the acid buffer salt is mono-basic, mono-hydrate sodium phosphate.

12. The process of claim 10 in which the acid buffer salt is one of the group consisting of mono-basic, monohydrate sodium phosphate; mono-basic potassium phosphate; and mono-basic ammonium phosphate.

13. The process of claim 8 in which ¼ percent, by weight, of acetic anhydride is added to the composition before the capsules are formed.

14. A tablet component material comprising minute seamless-walled capsules each consisting of a wall of ethyl cellulose protectively retaining at least one particle of aspirin coated with a buffering salt selected from the group consisting of the sodium, potassium, and ammonium mono-basic phosphate salts, made according to the process of claim 12.

References Cited

UNITED STATES PATENTS

| | | | |
|---|---|---|---|
| 3,115,441 | 12/1963 | Hermelin | 167—82 |
| 3,155,590 | 11/1964 | Miller et al. | 167—83 |
| 3,161,602 | 12/1964 | Herbig et al. | 252—316 |

LEWIS GOTTS, *Primary Examiner.*

S. K. ROSE, *Assistant Examiner.*